(12) United States Patent
Bichler et al.

(10) Patent No.: US 10,346,652 B2
(45) Date of Patent: Jul. 9, 2019

(54) METHOD FOR THE REHABILITATION OF A PIPELINE, APPLICATION DEVICE AND READ-OUT DEVICE

(71) Applicant: Trelleborg Pipe Seals Duisburg GmbH, Duisburg (DE)

(72) Inventors: Andreas Bichler, Tirol (AT); Hendrik Willem Hagenberg, LN Aalsmeer (NL)

(73) Assignee: TRELLEBORG PIPE SEALS DUSIBURG GMBH (DE)

( * ) Notice: Subject to any disclaimer, the term of this patent is extended or adjusted under 35 U.S.C. 154(b) by 492 days.

(21) Appl. No.: 14/580,793

(22) Filed: Dec. 23, 2014

(65) Prior Publication Data

US 2016/0061374 A1  Mar. 3, 2016

(30) Foreign Application Priority Data

Aug. 26, 2014 (DE) .................. 10 2014 112 254

(51) Int. Cl.
| | |
|---|---|
| *G06K 7/10* | (2006.01) |
| *F16L 55/165* | (2006.01) |
| *F16L 55/179* | (2006.01) |
| *F16L 55/26* | (2006.01) |

(52) U.S. Cl.
CPC ...... *G06K 7/10366* (2013.01); *F16L 55/1651* (2013.01); *F16L 55/179* (2013.01); *F16L 55/265* (2013.01); *F16L 2201/60* (2013.01)

(58) Field of Classification Search
CPC ............. G06K 7/10366; F16L 55/1651; F16L 55/179; F16L 2201/60

USPC ............................................. 138/104, 98, 97
See application file for complete search history.

(56) References Cited

U.S. PATENT DOCUMENTS

| | | | | |
|---|---|---|---|---|
| 4,430,613 A | * | 2/1984 | French ................... | G01V 3/081 324/200 |
| 5,122,750 A | * | 6/1992 | Rippingale ............ | G02B 6/447 324/207.22 |
| 5,277,951 A | * | 1/1994 | Hope ..................... | F16L 23/032 428/36.9 |
| 5,354,521 A | * | 10/1994 | Goodman ............... | F16L 11/12 264/108 |
| 5,491,637 A | * | 2/1996 | Kraemer ............ | G05B 19/4183 138/104 |
| 5,653,264 A | * | 8/1997 | Atkinson .................. | F15D 1/02 138/103 |

(Continued)

FOREIGN PATENT DOCUMENTS

| | | |
|---|---|---|
| DE | 4323182 C1 | 7/1994 |
| DE | 202007004631 U1 | 3/2008 |

(Continued)

*Primary Examiner* — Craig M Schneider
*Assistant Examiner* — David R Deal
(74) *Attorney, Agent, or Firm* — Dickinson Wright PLLC

(57) ABSTRACT

A method for the rehabilitation of a pipeline with a lining element made of a resin-absorbing material, comprising the following steps: Impregnating the lining element with a hardenable resin; inserting the lining element into the pipeline and positioning the lining element at the pipeline section to be rehabilitated; pressing the lining element against the inner wall of the pipeline; hardening the lining element; and applying at least one information parameter to the lining element subsequent to its hardening.

9 Claims, 4 Drawing Sheets

(56) References Cited

U.S. PATENT DOCUMENTS

| | | | |
|---|---|---|---|
| 5,680,885 A * | 10/1997 | Catallo | F16L 55/1651 138/97 |
| 5,927,341 A * | 7/1999 | Taylor | B29C 63/28 138/97 |
| 6,170,531 B1 | 1/2001 | Jung | |
| 6,942,426 B1 | 9/2005 | Kampbell | |
| 7,308,911 B2 * | 12/2007 | Wilkinson | F16L 1/11 138/104 |
| 7,513,275 B2 * | 4/2009 | Lazzara | F16L 55/1686 138/97 |
| 8,807,873 B2 * | 8/2014 | Kiest, Jr. | F16L 55/165 405/184.2 |
| 2005/0092382 A1 | 5/2005 | Muhlin | |
| 2006/0219311 A1 * | 10/2006 | Kiest, Jr. | F16L 55/1651 138/98 |
| 2012/0007714 A1 * | 1/2012 | Muhlin | F16L 55/1653 340/10.1 |
| 2012/0312407 A1 | 12/2012 | Muhlin | |
| 2013/0284299 A1 * | 10/2013 | Schooley | F16L 55/00 138/104 |
| 2013/0321131 A1 * | 12/2013 | Tucker | G06K 7/10366 340/10.1 |
| 2014/0027000 A1 * | 1/2014 | Kiest, Jr. | F16L 55/1653 138/97 |
| 2014/0224130 A1 * | 8/2014 | Castellani | A47J 31/4492 99/295 |
| 2014/0236390 A1 * | 8/2014 | Mohamadi | B64C 19/00 701/2 |

FOREIGN PATENT DOCUMENTS

| | | |
|---|---|---|
| DE | 202010017654 U1 | 6/2012 |
| DE | 102011075404 | 8/2012 |
| DE | 102013211795 A1 | 6/2014 |
| WO | 2011104357 | 1/2011 |
| WO | WO2011036266 A1 | 3/2011 |
| WO | 2014022097 | 2/2014 |

* cited by examiner

METHOD FOR THE REHABILITATION OF A PIPELINE, APPLICATION DEVICE AND READ-OUT DEVICE

CROSS-REFERENCE TO RELATED APPLICATIONS

This application is related to, and claims the benefit of priority from, German Patent Application No. 10 2014 112 254.2, filed Aug. 26, 2014, the disclosure of which is incorporated herein by reference in its entirety.

FIELD OF THE INVENTION

The present invention relates to a method for the rehabilitation of a pipeline with a lining element made of a resin-absorbing material. The invention further relates to an application device for applying information to a hardened lining element and to a read-out device for reading out information applied to a lining element.

BACKGROUND

A method of the type mentioned above is used for the rehabilitation of pipelines, in particular of main pipes and/or branch pipes, in the area of the sewerage system. By inserting such a lining element, in particular leaking and defective sections of pipes, and in particular of pipe joint portions, can be rehabilitated. In the process, the lining element is permanently connected to the inner wall of the pipe to be rehabilitated. To this end, the lining element is provided with an adhesive and pressed against the inner pipe wall and hardened. A hardenable resin, in particular, is used as an adhesive.

The lining element most frequently comprises a substrate layer consisting of a resin-absorbing material, in particular a non-woven or a fiber material. Prior to the insertion of the lining element, the substrate layer is impregnated with the resin.

Subsequently, the lining element is brought by means of a rehabilitation device into its final position in the region to be rehabilitated. The rehabilitation device is also referred to as a packer. In order to press on and/or harden the lining element to the inner pipe wall, the known inversion methods, which can also be referred to as eversion methods, in particular, are then used. After the resin has hardened, the lining element rests against the inner pipe wall with a substance-to-substance connection.

A calibrating tube, which is configured to be expansible and inflatable, and which, in the inflated state, has the approximate size and shape of the pipe section to be rehabilitated, is most frequently used in the inversion method. The calibrating tube is pushed onto the rehabilitation device and fastened at each end to the rehabilitation device by means of clamping collars, so that an air-tight connection is produced. Then, the resin-impregnated lining element is placed on the calibrating tube. Moreover, the lining element can be pressed against the inner pipe wall also without using a calibrating tube. For this purpose, the lining element is preferably closed in the region of the branch pipe.

The lining element is inverted, pressed on and/or hardened while charging the calibrating tube and/or the lining element with a medium. In order to initiate the external reaction process of the resin, the calibrating tube is most frequently charged with water vapor. In order to obtain an optimal installation result, it is necessary to detect and evaluate the pressure and/or the temperature required for inversion, pressing-on and/or hardening, in order to increase or reduce the temperature and/or the pressure, if necessary. In order to detect the above-mentioned physical quantities or parameters, it is known to provide the lining element with sensors.

For example, a lining element is shown in U.S. Pat. No. 6,942,426 B1, which is provided with a plurality of temperature sensors that measure the temperature at the interface between the outer face of the lining element and the inner face of the pipe wall during hardening in order thus to determine the hardening temperature.

In addition, it is known from WO 2014/022097 A1 to provide the lining element with a transmitter comprising an RFID chip and a sensor. Physical quantities, such as, for example, pressure and temperature can be measured by means of the sensor during pressing-on and/or hardening. Information about the lining element and/or the pipeline to be rehabilitated is stored on the RFID chip, such as, for example, the duration and date of the repair process, the material used for the repair process and/or the position of the location to be rehabilitated within the pipeline. The measured physical parameters and the information stored on the RFID chip are then transmitted to a computer and evaluated. The evaluated data can then be stored for documentation purposes or printed out on paper. Furthermore, the measured physical parameter and the information stored on the RFID chip can also be read out after hardening by a robot inserted into the pipeline.

SUMMARY

The invention is based on the object of providing a method, an application device and a read-out device of the type mentioned in the introduction that enables an alternative option for documenting the inversion, hardening and/or pressing-on processes.

In order to accomplish the object, a method, an application device, and a read-out device are proposed.

Advantageous embodiments of the method according to the invention, the application device according to the invention and the read-out device according to the invention are the subject matter of the respective dependent claims.

The "lining elements" mentioned in the present invention can also be referred to as liners, rehabilitation elements or pipe liner elements. In principle, such a lining element can have a single-part or multi-part configuration. Moreover, the "rehabilitation device" referred to in the present invention is also referred to as a packer.

The inventive method serves for the rehabilitation of a pipeline, in particular for the rehabilitation of a connecting portion between a main pipeline and a branch pipeline. The main pipeline is also referred to as the main duct, and the branch pipeline is also referred to as the house connection. In the method according to the invention for the rehabilitation of a pipeline, a lining element made of a resin-absorbing material is used, which comprises the following steps. First, the lining element is impregnated with a hardenable resin. Then, in particular by means of a packer, the lining element is introduced into the pipeline and positioned at the pipeline to be rehabilitated or the pipeline section to be rehabilitated. Then, the lining element is pressed against the inner wall of the pipeline. Then, the lining element is hardened, and finally, at least one information parameter is applied to the lining element subsequent to its hardening.

In the method according to the invention, in the form of information parameters is thus applied to the lining element subsequent to its hardening. The application can be carried out by means of a separate device, which is configured in such a manner that it moves within the main pipeline to the hardened lining element and applies the information to the lining element. However, the information may also be applied directly after hardening by means of a device connected to the rehabilitation device.

Advantageously, the information is applied in the region of a main pipe section of the lining element. The information may be, for example, a QR code and/or a storage medium provided with information. The information is applied to the lining element in such a manner that it is permanently connected to the lining element and resistant to chemical reactions of the waste water and/or the substances transported with the waste water. Thus, the information can be read out at any time. Advantageously, a device configured especially for this purpose is used to this end, which moves within the main pipeline to the lining element provided with the information and reads out the latter by means of a read-out instrument and transmits it to an evaluation device or data processing system, for example a PC, disposed at the surface. Transmission can take place wirelessly and/or via a cable. The read-out information can then contain information about the liner, the pipeline and/or the previous inversion, pressing-on and/or hardening process.

In an advantageous embodiment, the applied information can be viewed and evaluated by means of an evaluation program located on a mobile phone. The evaluation program is advantageously configured in the form of an app that can be down-loaded to the mobile phone. Advantageously, the applied information is transmitted by means of a read-out instrument to the mobile phone by means of known transmission methods.

In an advantageous embodiment, the applied information comprises an evaluation protocol and/or refers to an evaluation protocol stored in a cloud. Advantageously, the evaluation protocol comprises information about the lining element and/or the pipeline and information about the inversion, pressing-on and/or hardening process. Advantageously, the information about the inversion, pressing-on and/or hardening process are configured as measured values, which may also be referred to as physical quantities or physical parameter, and which are measured during inverting, pressing-on and/or hardening. Furthermore, the measured values can be represented in the form of graphs in the evaluation protocol.

The protocol stored in the cloud can be provided with an access code. The latter is handed over to the client by the company carrying out the rehabilitation process. Thus, an unauthorized access to the evaluation protocol stored in the cloud by unauthorized third parties is avoided.

In an advantageous embodiment, the information is stored as a QR code applied to the liner. Advantageously, the QR code refers to an evaluation protocol stored in a cloud. In an advantageous embodiment, an access code is stored in the QR code, with which an evaluation protocol stored in a cloud can be accessed. Furthermore, an evaluation protocol stored in a cloud can also be accessed directly by reading out the QR code.

Advantageously, the QR code is applied by means of laser engraving, laser printing and/or inkjet printing. Advantageously, the ink used for application is a special ink that is resistant to chemical reactions of the waste water and/or the transported substances.

Advantageously, the information is applied to a storage medium connected to the lining element. The storage medium is connected to the lining element prior to the insertion of the lining element into the pipeline. Advantageously, the storage medium is configured as an RFID chip. The RFID chip can be configured as an active and/or passive RFID chip. The storage medium can be connected to the lining element in such a manner that, in the hardened state, it is disposed between the inner pipe wall and the outer face of the lining element or on an inner face of the lining element facing towards the pipe interior.

In an advantageous embodiment, the information is stored on a storage medium that is connected to the lining element. The storage medium is connected to the lining element after hardening. The storage medium can be configured as an RFID chip. Advantageously, the RFID chip is an active and/or passive RFID chip.

The storage medium can be connected to the lining element by a substance-to-substance connection and/or by frictional engagement. Advantageously, the storage medium is glued and/or welded to the lining element. Thus, a firm, loss-proof connection of the storage medium and the lining element is produced, so that a detachment due to the substances transported with the waste water or rain water is avoided.

In an advantageous embodiment, the evaluation protocol is prepared in a data processing system. In the present case, the data processing system is also referred to as the evaluation device. The data processing system can be configured as a PC. The evaluation protocol can be transmitted to a cloud by means of the data processing system. In addition, the evaluation protocol can be transmitted to a third party by means of the data processing system.

In an advantageous embodiment, the evaluation protocol comprises digitally registered parameters and/or data that are transmitted to the data processing system. The following digital parameters and/or data can be registered: the location of the lining element and the pipeline, the times, the pressure and/or the temperature during inversion, the pressure and/or the temperature of the medium for pressing on and/or hardening, the external and/or the duct temperature, the vacuum pressure and/or the weights of the resins or resin components and/or the total weight of the resin system used. A sensor can be disposed within the lining element and/or the calibrating tube for measuring the pressure and/or the temperature. The sensor transmits the measured values or parameters to the data processing system. Advantageously, the sensor converts the measured physical quantities or parameters into radio signals. The radio signals can be transmitted wirelessly to the data processing system. Moreover, the sensor can transmit the radio signals to a receiver that converts them into electrical signals and transmits them to the data processing system. The transmission of the electrical signals to the data processing system can also be carried out by means of a cable. Advantageously, the receiver is disposed on a rehabilitation device.

In order to measure the external temperature and/or the duct temperature, the rehabilitation device can be provided with separate temperature sensors which, as described above, transmit the measured values to the data processing system. In order to measure the location, the rehabilitation device can be provided with a GPS receiver which transmits the received GPS data to the data processing system. The weights of the resins or resin components are determined during weighing on a scale and transmitted to the data processing system by means of radio and/or cable. Furthermore, the scale can also determine the total weight of the resin system and transmit it to the data processing system. Moreover, the total weight can also be determined by means of the data processing system based on the weight of the individual resin components.

In an advantageous embodiment, an automatic resin mixing unit is used for producing a resin system. The automatic resin mixing unit mixes resins or resin components to form a resin system with which the lining element is impregnated. Advantageously, the automatic resin mixing unit transmits the resins and/or the resin system used for the rehabilitation (type, manufacturer, batch number, quantity), the weight of the individual resins and the total weight of the resin system to the data processing system by means of radio and/or cable.

Advantageously, the evaluation protocol comprises data and/or parameters about the lining element and/or the pipeline, which are registered in the data processing system. The following data and/or parameters are registered in the data processing system: city, street, date, weather, temperature, operator (systems operator), client, contractor, the numbers of the shafts of the main duct, the position of the shafts of the main duct, the flow direction of the main duct (from shaft to shaft), house connection data, such as, for example, house number and/or position, position of the junction of the house connection in the main duct, the connection angle of the house connection to the main pipeline, the pipe material of the main duct, the pipe material of the house connection, the pipe diameter of the main duct, the pipe diameter of the house connection, the temperature in the main duct, general remarks concerning the main duct and/or the house connection, preliminary work in the main duct and/or house connection, material used for the lining element (type of lining element, manufacturer, batch number, quantity), resin and/or resin system used for the rehabilitation (type, manufacturer, batch number, quantity), on-site manufacturing data, such as, for example, the mixing time of the resin system, the resin temperature, the temperature of the lining element, the vacuum pressure and/or the time for the impregnation. Moreover, target values, such as, for example, the installation time, inversion pressure, hardening data, in particular the pressure and/or the temperature of the medium, heating time or cooling time, which are then compared to the digitally registered data during inversion, pressing-on and/or hardening, can be inputted into the data processing system. Thus, these quantities or parameters can be adapted and/or adjusted accordingly.

Further, the invention relates to an application device for applying information to a hardened lining element with at least one application apparatus. The information is applied by means of the application apparatus to the lining element after that has hardened. Advantageously, the application device has a travel unit. The application device can be provided with a camera for orientation purposes.

Advantageously, the application apparatus is configured as a laser, laser printer and/or inkjet printer.

Further, the invention relates to a read-out device for reading out information applied to a lining element with at least one read-out apparatus. In an advantageous embodiment, the read-out device is provided with a travel unit. Advantageously, the read-out device transmits the read-out information to a data processing system disposed at the surface. Transmission can take place wirelessly and/or via a cable. The read-out device can be provided with a camera for orientation purposes.

In an advantageous embodiment, the read-out apparatus is configured as a scanner and/or receiver. Advantageously, the scanner is configured as a QR code scanner. The read-out device may also be configured as a camera for reading the applied information.

BRIEF DESCRIPTION OF THE DRAWINGS

The method according to the invention, the application device according to the invention and the read-out device according to the invention are explained in more detail below with reference to the attached drawings. The Figures schematically show.

WRITTEN DESCRIPTION

Figure 1:
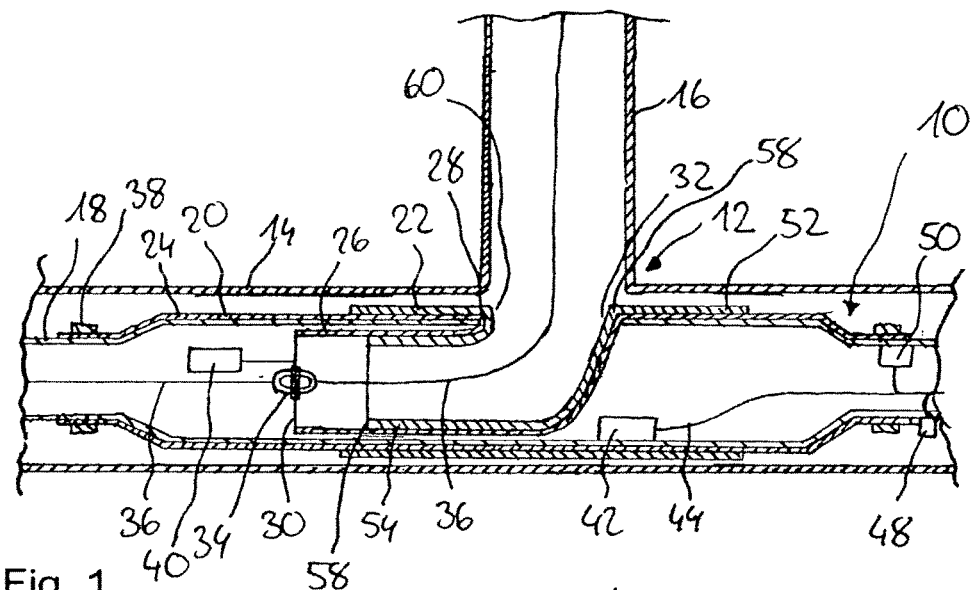
FIG. 1 a vertical section through a pipeline which is being rehabilitated by means of an inventive method according to a first embodiment.

FIG. 1 shows a rehabilitation system 10 which serves for the rehabilitation of a connecting portion 12 between a main pipeline 14, which is also referred to as the main duct, and a branch pipeline 16, which is also referred to as the house connection pipe. The rehabilitation system 10 has a rehabilitation device 18, which is also referred to as a packer, a calibrating tube 20 and a lining element 22. By means of the rehabilitation device 18, the calibrating tube 20 and the lining element 22 are transported to the pipe section to be rehabilitated.

Figure 2:
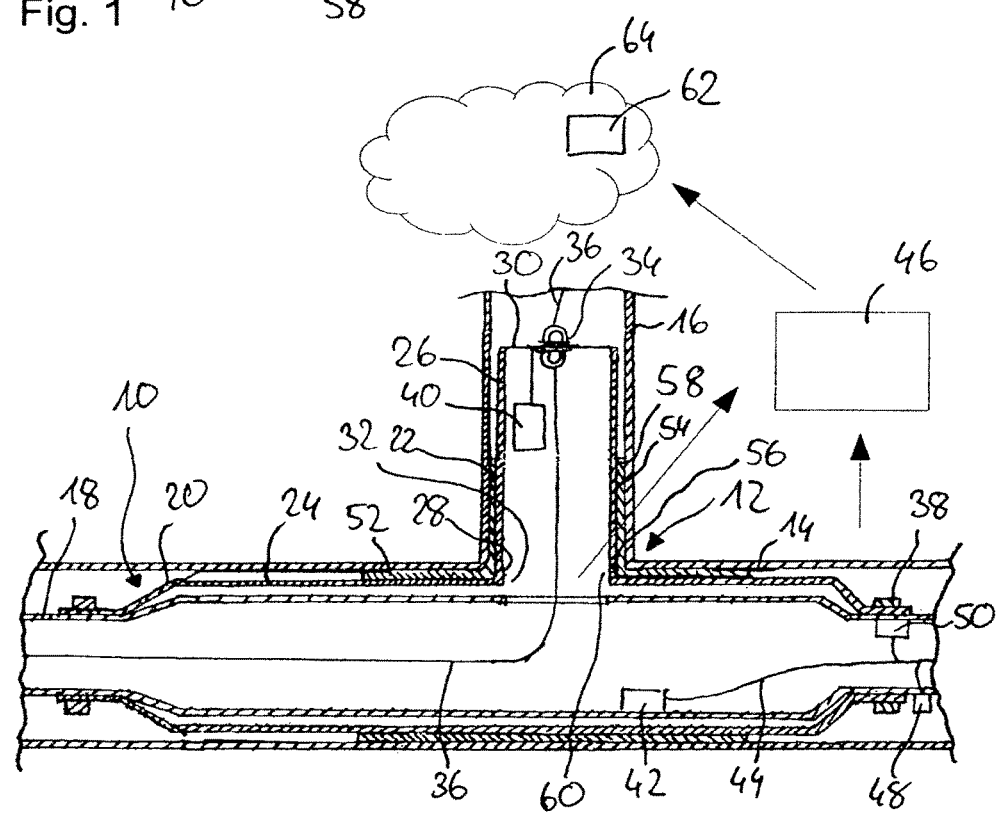
FIG. 2 a vertical section through the pipeline with a lining element pressed on by means of the inventive method according to a first embodiment, and the registration of data and forwarding of these data to a cloud during the pressing-on process.

The calibrating tube 20 serves for inverting, pressing on and/or hardening the lining element 22 to the inner pipe wall, as is shown in FIG. 2. The calibrating tube 20 is configured to be expansible and inflatable, and, in the inflated state, has the approximate size and shape of the pipe section to be rehabilitated. In the present case, the calibrating tube 20 is configured as a single piece and has a tubular main pipe section 24 and a tubular branch pipe section 26. The branch pipe section 26 has a first end portion 28 and a second end portion 30, the first end portion 28 being connected with a substance-to-substance connection and/or sewed to the main pipe section 24 in the region of an opening 32 introduced into the main pipe section 24. In the present case, the branch pipe section 26 projects from the main pipe section 24 at right angles. The branch pipe section 26 can also project from the main pipe section 24 at a different angle. The branch pipe section 26 is closed at its second end portion 30. The second end portion 30 is provided with a pulling means device 34, on both sides of which one pulling means 36, respectively, is disposed. The branch pipe section 26 is folded over or inverted into the branch pipeline 16 by means of the pulling means 36 protruding into the branch pipeline 16. After the lining element 22 has hardened, the branch pipe section 26 is pulled out of the branch pipeline 16 again by means of the pulling means 36 disposed within the rehabilitation device 18. The pulling means 36 can be configured as a rope and/or a cable pulling device. In an alternative embodiment, which is not shown, it is also possible to invert the branch pipe section 26 into the branch pipeline 16 by pressurization. The calibrating tube 20 is fastened at each end to the rehabilitation device 18 by means of clamping collars 38, so that an air-tight connection is produced.

A first sensor 40, which serves for measuring physical quantities or parameters of the medium introduced into the calibrating tube 20, such as pressure, temperature and/or flow rate, is disposed at the second end portion 30 of the calibrating tube 20. The medium can be air, water vapor and/or water. The sensor 40 converts the measured physical quantities into radio signals and transmits them to a receiver 42 disposed on the rehabilitation device 18. Then, the receiver 42 converts the radio signals into electrical signals and transmits them to the data processing system 46 located on the surface via a cable 44. The data processing system 46 can be configured as a PC, so that the transmitted measured values can be digitally evaluated and stored on a storage medium. The hard disk of the data processing system 46, an SD chip and/or a cloud service may serve as the storage medium. Moreover, the measured values can also be transmitted online by means of the data processing system 46 for logging purposes. In addition, the sensor 40 can be configured in such a manner that it transmits the measured values directly to the data processing system 46 by radio.

Furthermore, the rehabilitation device 18 has a second sensor 48, which is disposed outside the calibrating tube 20 and which measures the external and/or duct temperature. The sensor 48 is connected to the cable 44, so that the measured values are transmitted to the data processing system 46. Moreover, the second sensor 48 is also able to transmit the measured values to the data processing system 46 wirelessly. In addition, the rehabilitation device 18 comprises GPS receiver 50, which determines the location of the pipeline to be rehabilitated and transmits it to the data processing system 46. The transmission of the location data to the data processing system 46 can take place either via the cable 48 and/or by radio.

The lining element 22 is configured to consist of a single piece and be approximately T-shaped and rests against the inner wall of the pipeline in the installed state. The lining element 22 has a substrate layer of a continuous layer of fiber material. In particular, the substrate layer is formed as a Multiknit non-woven or Kunit non-woven and comprises a plurality of interwoven polyester fibers and/or glass fibers. The substrate layer can be impregnated with a hardenable resin and, in the hardened state, rests against the area of the pipe to be rehabilitated, in particular with a substance-to-substance connection. Prior to the insertion of the lining element 22 into the pipeline, the substrate layer is impregnated with a resin. Moreover, the substrate layer can be provided with a coating system of several inter-connected layers or plies, which is not shown. The individual layers or plies can be formed from silicone or thermoplastic polyurethane. In the installed state, the coating points into the interior of the pipe.

The lining element 22 has a tubular main pipe section 52 and a tubular branch pipe section 54. The branch pipe section 54 has a first end section 56 and a second end section 58, the first end section 56 being connected and/or sewed to the main pipe section 52 in the region of an opening 60 introduced into the main pipe section 52.

The rehabilitation of the connecting portion 12 by means of the method according to the invention is explained below. First, the calibrating tube 20 is pushed onto the rehabilitation device 18, wherein the main pipe section 24 is fastened at each end to the rehabilitation device 18 by means of clamping collars 38, so that an air-tight connection is produced, as is shown in FIG. 1. Then, the resin-impregnated lining element 22 is pushed onto the calibrating tube 20. For impregnating the lining element 22 with a resin, the individual resins or resin components are first weighed with a scale, which is not shown, then mixed to form a resin system, and finally, the lining element is impregnated with the resin system. The weight of the individual resin components is digitally registered by the scale and transmitted to the data processing system 46. In addition, the total weight of the resin system is digitally registered and transmitted to the data processing system 46. The transmission can take place either via cable, radio and/or by means of a storage medium, such as an SD chip, for example. Moreover, an automatic resin mixing unit can be used for producing the resin system, which mixes resins or resin components to form a resin system. The automatic resin mixing unit transmits the resins and/or the resin system used for the rehabilitation (type, manufacturer, batch number, quantity), the weight of the individual resins and the total weight of the resin system to the data processing system by means of radio and/or cable. In the pushed-on state, the main pipe section 52 of the lining element 22 surrounds the main pipe section 24 of the calibrating tube 20, and the branch pipe section 42 of the lining element 22 surrounds the branch pipe section 26 of the calibrating tube 20, wherein the branch pipe section 26, in the inflated state, can extend through the branch pipe section 42, as shown in FIG. 2.

Figure 3:
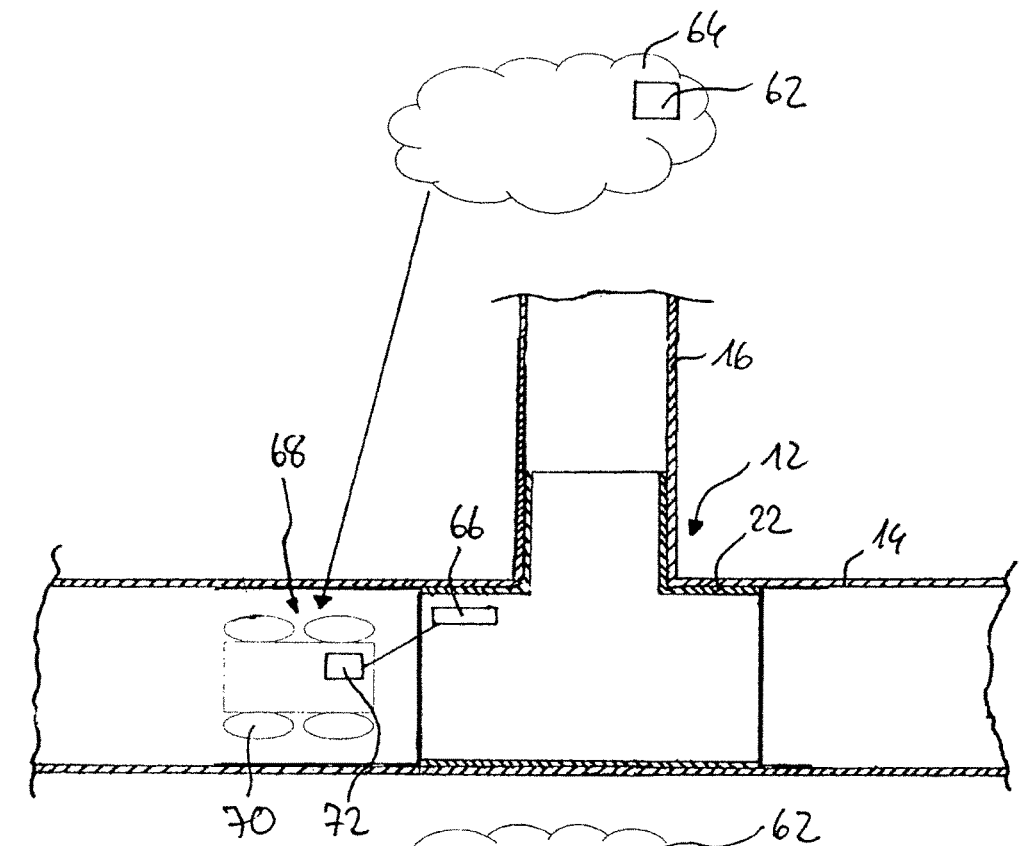
FIG. 3 a vertical section through the pipeline with a hardened lining element with an application device according to a first embodiment.

After pushing the lining element 22 onto the calibrating tube 20, the calibrating tube 20 is inflated in order to check its tightness. Then, the air is let out of the calibrating tube 20 and the two branch pipe sections 26, 54 are inverted into the interior of the rehabilitation device 18 by means of the pulling means 36. Subsequent thereto, the rehabilitation device 18 is moved to and positioned at the connecting portion 12 to be rehabilitated in such a way that the branch pipe sections 26, 54 can be inverted into the branch pipeline 16. After the exact positioning, the branch pipe section 26 is inverted into the branch pipeline 16 by means of the pulling means 36. Then, the calibrating tube 20 is charged with a medium, such as air, water and/or water vapor, for example. Because of the calibrating tube 20 being charged with a medium, the lining element 22 is pressed against the connecting portion 12, the main pipeline 14 and the branch pipeline 16, as is shown in FIG. 2. In the process, the resin is hardened and the lining element 22 is connected by a substance-to-substance connection to the inner wall of the connecting portion 12, the main pipeline and/or the branch pipeline 16, as is shown in FIG. 3.

During inversion, pressing-on and/or hardening, the temperature, the pressure and/or the flow rate of the medium is measured by the first sensor 40 and transmitted to the data processing system 46, as described above. The measured values can then be digitally evaluated in the data processing system 46. Prior to, during and/or subsequent to inversion, pressing-on and/or hardening, the second sensor 48 measures the external temperature and/or the duct temperature and also transmits them to the data processing system 50, as described above. Furthermore, the GPS receiver 50 transmits the location of the connecting portion 12 to be rehabilitated to the data processing system 50, as described above. As a consequence of the digital registration of the physical quantities, the temperature, the pressure and/or the flow rate of the medium can be adapted and/or adjusted exactly.

In addition to these data and/or parameters, the following data and/or parameters are registered by inputting in the data processing system 46: city, street, date, weather, temperature, operator (systems operator), client, contractor, the numbers of the shafts of the main duct, the position of the shafts of the main duct, the flow direction of the main duct (from shaft to shaft), house connection data, such as, for example, house number and/or position, position of the junction of the house connection in the main duct, the connection angle of the house connection to the main pipeline, the pipe material of the main duct, the pipe material of the house connection, the pipe diameter of the main duct, the pipe diameter of the house connection, the temperature in the main duct, general remarks concerning the main duct and/or the house connection, preliminary work in the main duct and/or house connection, material used for the lining element (type of lining element, manufacturer, batch number, quantity), resin and/or resin system used for the rehabilitation (type, manufacturer, batch number, quantity), on-site manufacturing data, such as, for example, the mixing time of the resin system, the resin temperature, the temperature of the lining element, the vacuum pressure and/or the time for the impregnation. Moreover, target values, such as, for example, the installation time, inversion pressure, hardening data, in particular the pressure and/or the temperature of the medium, heating time or cooling time, which are then compared to the digitally registered data during inversion, pressing-on and/or hardening, can be inputted into the data processing system. Thus, the temperature, the pressure and/or the flow rate of the medium can be adapted and/or adjusted. The registration of these data can take place prior to the introduction of the rehabilitation device 18 into the pipeline, during the transport of the lining element 22 to the connecting portion 12 to be rehabilitated, during inversion, pressing-on, hardening and/or after the rehabilitation is completed.

After the lining element 22 has hardened, the medium is discharged from the calibrating tube 20 and the branch pipe section 26 is inverted into the rehabilitation device 19 by means of the pulling means 36 disposed within the calibrating tube 20. Then, the rehabilitation device 18 is removed from the main pipeline 14.

The measured values registered in the data processing system 46 are summarized in an evaluation protocol 62 and transmitted to a cloud 64, as is shown in FIG. 2. In the cloud 64, the evaluation protocol 62 is provided with an access code, which refers to this evaluation protocol 62. An unauthorized access to the evaluation protocol 62 stored in the cloud 64 by unauthorized third parties is prevented by the access code. The access code is handed over to the client by the company carrying out the rehabilitation process.

The access code is finally converted into a QR code 66 and transmitted to an application device 68, which then applies the QR code 66 to the hardened application device 22.

For this purpose, the application device 68 has a travel unit 70 and an application apparatus 72 for applying the QR code 66. The application apparatus 72 can be configured as a laser, laser printer and/or inkjet printer. Thus, the application apparatus can apply the QR code by means of laser engraving, laser printing and/or inkjet printing. Advantageously, the ink used for application is a special ink that is resistant to chemical reactions of the waste water and/or the transported substances.

In order to apply the QR code 66 onto the lining element 22, the application device 68 moves in the main pipeline 14 to the hardened lining element 22. For better orientation, the application device 68 can be provided with a camera, which is not shown. When the application device 68 has reached the hardened lining element 22, the QR code 66 is applied to the lining element 22, in particular to its main pipe section 52, as is shown in FIG. 3. Subsequent thereto, the application device 68 is retracted again from the main pipeline 14.

Figure 4:
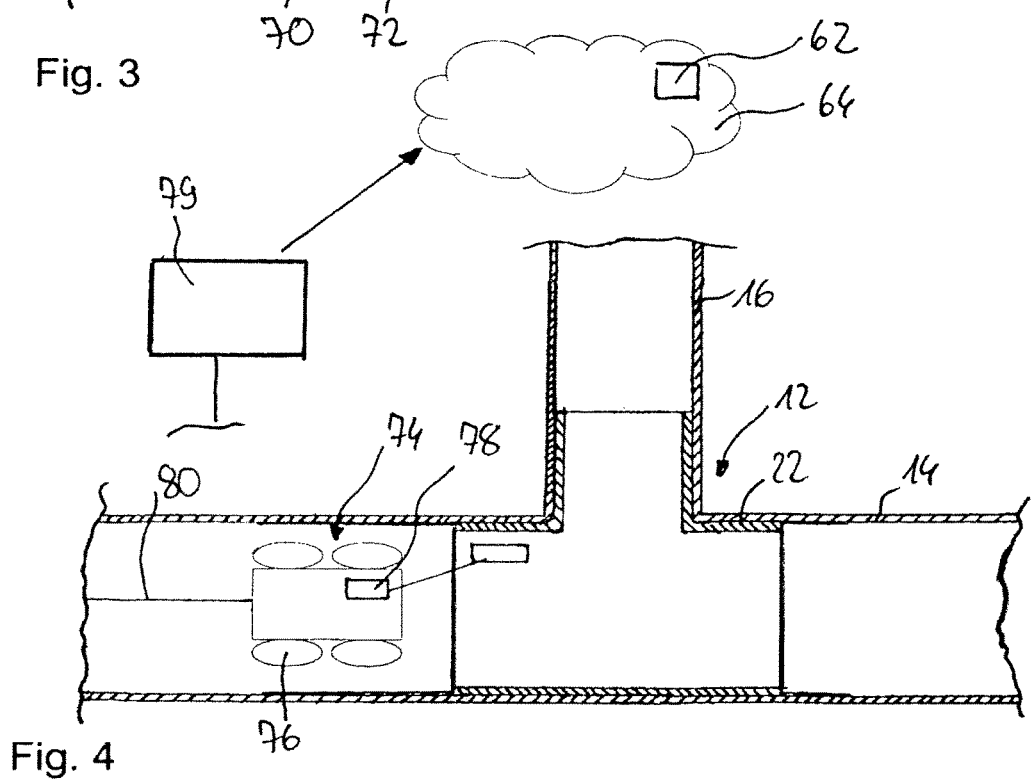
FIG. 4 a vertical section through a pipeline with the hardened lining element and a read-out device according to a first embodiment.

In order to read out the QR code 66, a read-out device 74 is used, which has a travel unit 76 and a read-out apparatus 78, as is shown in FIG. 4. The read-out apparatus 78 can be configured as a QR code scanner and/or camera.

In order to read out the QR code 66, the read-out device 74 moves in the main pipeline 14 to the hardened lining element 22. For better orientation, the read-out device 74 can be provided with a camera, which is not shown. Then, the QR code is scanned and/or filmed by means of the read-out apparatus 78 and transmitted to a data processing system 79 disposed at the surface, which may be configured as a PC. Transmission can take place via a cable 80 connected to the read-out device 74 and/or by radio. The read-out QR code 66 is then converted in the data processing system into the access code in order to be able to retrieve the evaluation protocol 62 stored in the cloud 64.

In an embodiment not shown, the lining element 22 is configured in such a manner that no calibrating tube in the region of the branch pipe section 54 is required for inverting, hardening and/or pressing on. For this purpose, the second end section 58 is closed at its end with an end cap that can be pulled off. The end cap that can be pulled off is connected by substance-to-substance connection and/or sewed to the second end section 58. The end cap that can be pulled off can also be glued to the second end section 54. After the lining element 22 has hardened, the end cap that can be pulled off can be removed from the second end section 58 by means of a pulling means 36 attached thereto and pulled into the main pipe section 24 of the calibrating tube 20. Furthermore, the end cap that can be pulled off can be provided with the first sensor 40.

In further embodiments that are not shown, the second end portion 40 of the branch pipe section 26 and/or the end cap that can be pulled off can be provided with an outlet valve serving for regulating the pressure within the lining element 22 or the calibrating tube 20. The outlet valve is configured, in particular, as an overpressure valve. In case of overpressure, the medium can be discharged by means of the outlet valve during inversion, pressing-on and/or hardening. If, in case of an overpressure, the pressure required for inversion, pressing-on and/or hardening is reached again after the valve has been opened, the valve closes again automatically.

Figure 5:
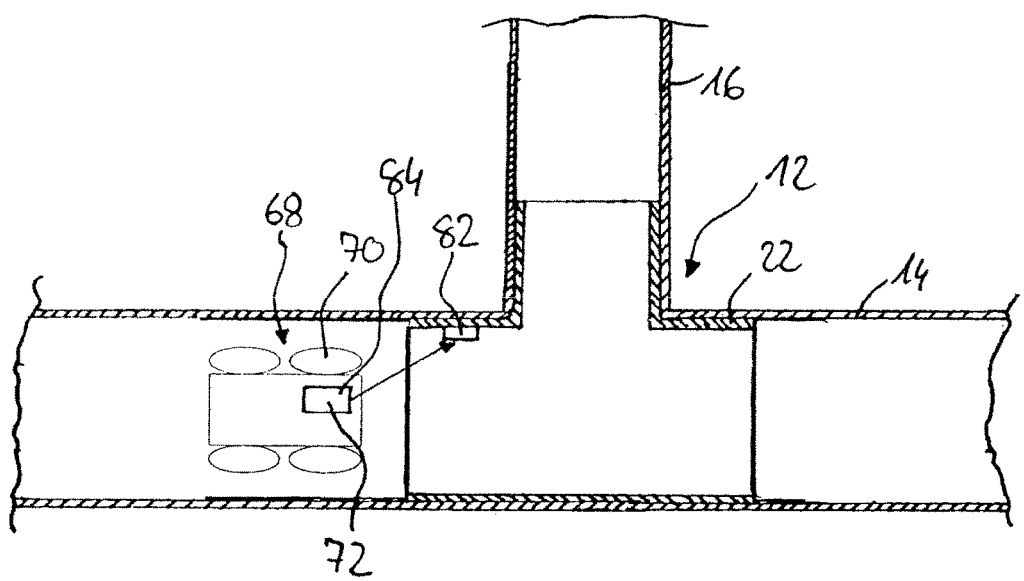
FIG. 5 a vertical section through a pipeline with a lining element hardened by means of an inventive method according to a second embodiment and an application device according to a second embodiment.
Figure 6:
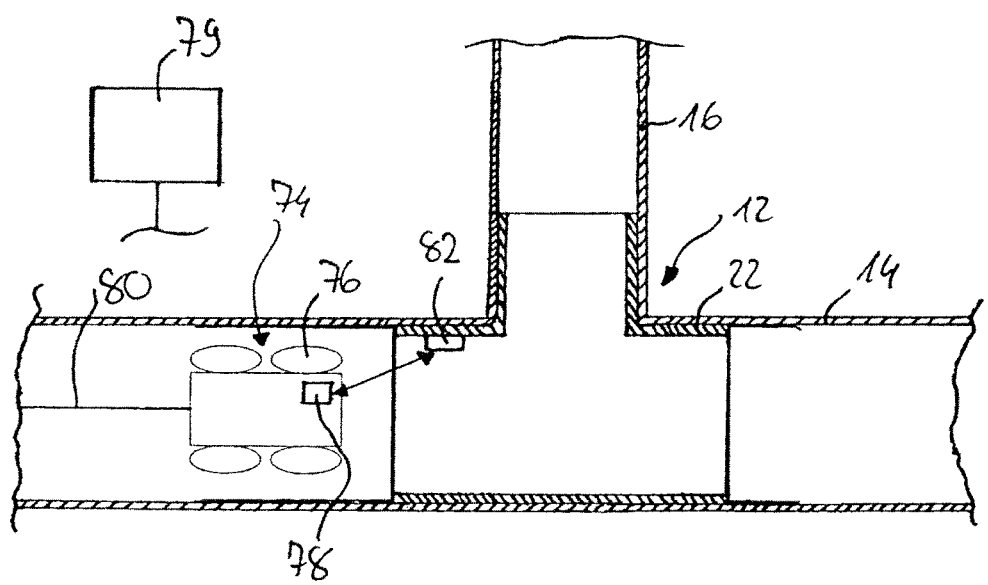
FIG. 6 a vertical section through the pipeline with a hardened lining element and a read-out device according to a second embodiment.

FIGS. 5 and 6 disclose a method according to the invention for the rehabilitation of a connecting portion 12 according to a second embodiment. The inventive method according to the second embodiment differs from the first embodiment in that the lining element 22 is provided with a storage medium 82 that is connected by substance-to-substance and/or frictional engagement to the lining element 22. The storage medium 82 can be configured as an active and/or passive RFID chip. The storage medium 82 can be connected by substance-to-substance and/or frictional engagement to the lining element 22 before or after impregnating the lining element 22 with resin, before or after pushing the lining element 22 onto the calibrating tube 20. Furthermore, the storage medium 82 can be connected to the lining element 22 in such a manner that, in the hardened state of the lining element 22, it is either disposed between the inner pipe wall and the lining element 22 or faces towards the pipe interior. In the present case, the storage medium 82 faces towards the pipe interior and is disposed in the region of the main pipe section 52. The storage medium can also be disposed in the region of the branch pipe section 54.

In the inventive method according to the second embodiment, the introduction, inversion, pressing-on and/or hardening, as well as the digital registration of the measured values and the manual registration of data in the data processing system 46 take place as described in the case of the method according to the first embodiment.

After the evaluation protocol 42 has been prepared in the data processing system 46, it is transmitted to an application device 68 according to a second embodiment. Transmission can take place wirelessly, by means of a storage medium, such as an SD chip, or via a cable. The application device 68 according to the second embodiment differs from the application device 68 according to the first embodiment in that, in addition to the travel unit 64, it comprises a transmission unit 84, which applies or transmits the evaluation protocol 62 via radio to the storage medium 82 connected to the lining element 22.

For this purpose, the application device 68 moves in the main pipeline 14 to the hardened lining element 22, as is shown in FIG. 5. For better orientation, the application device 68 can be provided with a camera, which is not shown. When the application device 68 has reached the lining element 22, it sends the evaluation protocol 62 or the data thereof to the storage medium. The storage medium 82 receives the evaluation protocol 62 or the data thereof and stores it. After the transmission of the evaluation protocol, the application device 68 is retracted again from the main pipeline 14.

For reading out the data or the evaluation protocol 62 from the storage medium 82, a read-out device 74 according to a second embodiment is used, as is shown in FIG. 6, which differs from the read-out device according to the first embodiment in that it is provided with a read-out apparatus 86 that is capable of reading out the data stored on the storage medium 82. The read-out apparatus 86 can be configured as a receiver unit that is capable of reading out data stored on a passive and/or active RFID chip.

In order to read out the evaluation protocol or the data stored on the storage medium 82, the read-out device 74 moves in the main pipeline 14 to the hardened lining element 22. The read-out apparatus 86 then sends a signal which interacts with the storage medium 82, so that the read-out apparatus 86 is able to read out the evaluation protocol 62 or the data from the storage medium 82. The data are transmitted to a data processing system 79 disposed at the surface. Transmission can take place via a cable 80 connected to the read-out device 74 and/or wirelessly to the data processing system 79.

The read-out evaluation protocol 62 can then be viewed in the data processing system 79.

Figure 7:
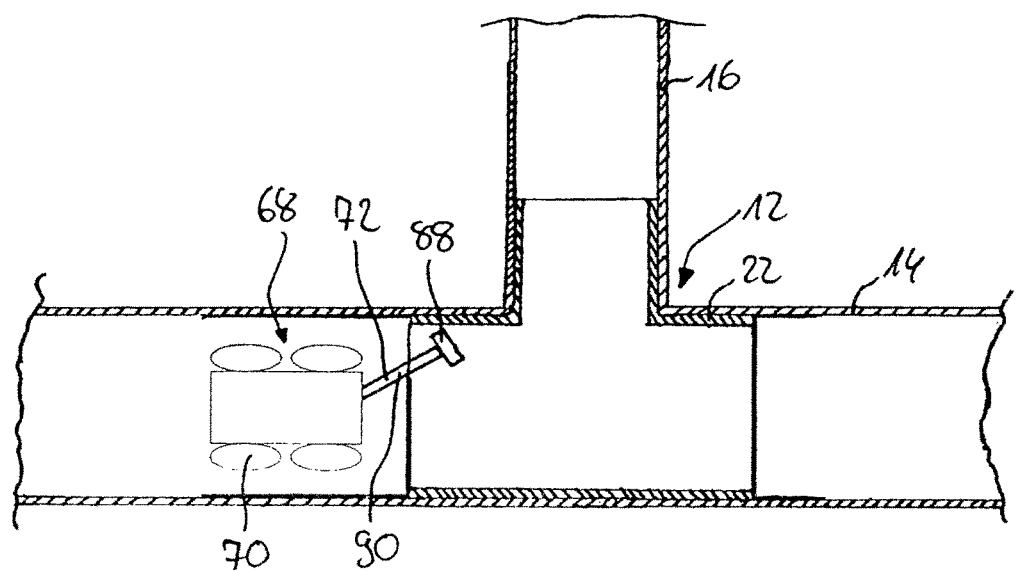
FIG. 7 a vertical section through a pipeline with a lining element hardened by means of an inventive method according to a third embodiment and an application device according to a third embodiment.
Figure 8:
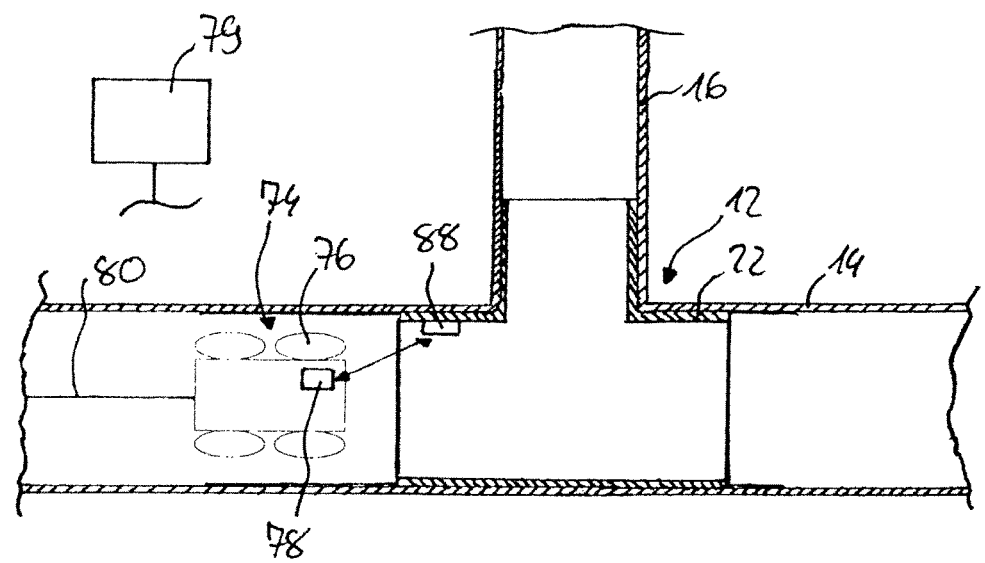
FIG. 8 a vertical section through the pipeline with a hardened lining element and a read-out device according to the second embodiment.

FIGS. 7 and 8 illustrate an inventive method according to a third embodiment, which differs from the first two embodiments in that, after the lining element 22 has hardened, a storage medium 82 is connected to the lining element 22 by substance-to-substance and/or frictional engagement. The storage medium 88 may be configured as an RFID chip, with the evaluation protocol 62 prepared in the data processing system 46 being stored on the storage medium 82 prior to the storage medium 88 being connected to the hardened lining element 22.

In order to connect the storage medium 88 to the lining element 22, an application device 68 according to a third embodiment is used, which differs from the first two embodiments in that the application device 72 is configured as a storage medium attaching device 90. In order to apply the storage medium 88 to the hardened lining element 22, the application device 68 moves in the main pipeline 14 to the hardened lining element 22. For better orientation, the application device 68 can be provided with a camera, which is not shown. When the application device 68 has reached the lining element 22, the storage device attaching device 90 attaches the storage medium 88 to the lining element 22 by means of a substance-to-substance and/or frictional engagement, as is shown in FIG. 7.

For reading out the evaluation protocol 62 stored on the storage medium 88, a read-out device 74 according to the second embodiment and the previously described method for reading out is used, as shown in FIG. 8.

The methods according to the invention for the rehabilitation of a pipeline are characterized in that information is applied after the lining element 22 has hardened. In this case, the information can be configured as a QR code or in the form of a storage medium 82, 88 provided with information, which is connected to the lining element 22 prior to the introduction of the lining element 22 into the pipeline or after the lining element 22 has hardened. The information itself either refers to an evaluation protocol 62 stored in a cloud or is itself the evaluation protocol 62.

REFERENCE SIGN LIST

10 Rehabilitation system
12 Connecting portion
14 Main pipeline
16 Branch pipeline
18 Rehabilitation device
20 Calibrating tube
22 Lining element
24 Main pipe section
26 Branch pipe section
28 First end portion
30 Second end portion
32 Opening
34 Pulling means device
36 Pulling means
38 Clamping collars
40 First sensor
42 Receiver
44 Cable
46 Data processing system
48 Second sensor
50 GPS receiver
52 Main pipe section
54 Branch pipe section
56 First end section
58 Second end section
60 Opening
62 Evaluation protocol
64 Cloud
66 QR code
68 Application device
70 Travel unit
72 Application apparatus
74 Read-out device
76 Travel unit
78 Read-out apparatus
79 Data processing system 80 Cable
82 Storage medium
84 Transmitting unit
86 Read-out unit
88 Storage medium
90 Storage medium attaching device

The invention claimed is:

1. A method for the rehabilitation of a pipeline with a lining element made of a resin-absorbing material, comprising the following steps:
   a. impregnating the lining element with a hardenable resin;
   b. inserting the lining element into the pipeline and positioning the lining element at the pipeline section to be rehabilitated;
   c. pressing the lining element against the inner wall of the pipeline;
   d. hardening the lining element;
   e. digitally registering via at least one sensor parameters and/or data about inversion, pressing-on and/or hardening of the lining element;
   f. transmitting the digitally registered parameters and/or data to a data processing system;
   g. preparing an evaluation protocol in the data processing system using the transmitted digitally registered parameters and/or data;
   h. storing the evaluation protocol in a cloud; and
   i. following the transmission step and subsequent to hardening of the lining element, applying at least one information parameter to the lining element, wherein the at least one applied information parameter comprises the evaluation protocol and/or refers to the evaluation protocol.

2. The method according to claim 1, characterized in that the evaluation protocol stored in the cloud is provided with an access code.

3. The method according to claim 1, characterized in that the information is stored as a QR code applied to the lining element.

4. The method according to claim 3, characterized in that the QR code is applied by means of laser engraving, laser printing and/or inkjet printing.

5. The method according to claim 1, characterized in that the information is applied to a storage medium connected to the lining element.

6. The method according to claim 1, characterized in that the information is stored on a storage medium that is connected to the lining element.

7. The method according to claim 6, characterized in that the storage medium is connected to the lining element by a substance-to-substance connection and/or by frictional engagement.

8. The method according to claim 1, characterized in that the evaluation protocol is prepared in the data processing system.

9. The method according to claim 1, characterized in that the evaluation protocol comprises data concerning the lining element and/or the pipeline, which are registered in the data processing system.

* * * * *